(12) United States Patent
Zhao

(10) Patent No.: US 8,405,964 B2
(45) Date of Patent: Mar. 26, 2013

(54) DISPLAY HAVING HORIZONTALLY ROTATABLE DISPLAY PANEL

(75) Inventor: Jiang Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/181,487

(22) Filed: Jul. 12, 2011

(65) Prior Publication Data

US 2012/0307424 A1    Dec. 6, 2012

(30) Foreign Application Priority Data

Jun. 2, 2011    (CN) .......................... 2011 1 0147561

(51) Int. Cl.
*H05K 5/00*    (2006.01)
*A47B 81/00*    (2006.01)

(52) U.S. Cl. ......... 361/679.22; 361/679.21; 361/679.23; 361/679.26; 361/679.27; 361/679.29; 312/223.2; 312/223.3

(58) Field of Classification Search ............ 361/679.21–679.29, 679.51–679.55, 724–727; 312/223.2, 312/223.3
See application file for complete search history.

(56) References Cited

U.S. PATENT DOCUMENTS

2009/0184216 A1*    7/2009    Katsumata et al. ........ 248/124.1

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A display includes a base, a display panel, and a rotation device for making the display panel horizontally rotate relative to the base. The rotation device includes a ratchet wheel movably connected to the base, a rod rotationally connected to the ratchet wheel, a pawl rotationally connected to the rod and engaging with the ratchet wheel, a first elastic member connected between the rod and the pawl for supplying a restoring force to the pawl, a second elastic member connected between the base and the rod for supplying a restoring force to the rod, a slide member slidedly connected to the rod for swinging the pendulum rod, and a third elastic member connected between the slide member and the base for supplying a restoring force to the slide member. The display panel is fixed on the ratchet wheel and rotates as the ratchet wheel is rotated.

10 Claims, 4 Drawing Sheets

DISPLAY HAVING HORIZONTALLY ROTATABLE DISPLAY PANEL

BACKGROUND

1. Technical Field

The present disclosure relates to displays and, particularly, to a display having a horizontally rotatable display panel.

2. Description of Related Art

Many displays have a display panel fixed horizontally and/or vertically. Thus, when the display panel needs to be horizontally rotated, the whole display must be orientated on the desk by hand.

However, there is friction between the display and a desk supporting the display to prevent the display moving on the desk, and it needs much effort to move the whole display panel around. In addition, the amount of space available for any movement of the base of the display may be restricted.

Therefore, what is needed is a new display that can overcome the described limitations.

DETAILED DESCRIPTION

Embodiments will now be described in detail with reference to drawings.

Figure 1:
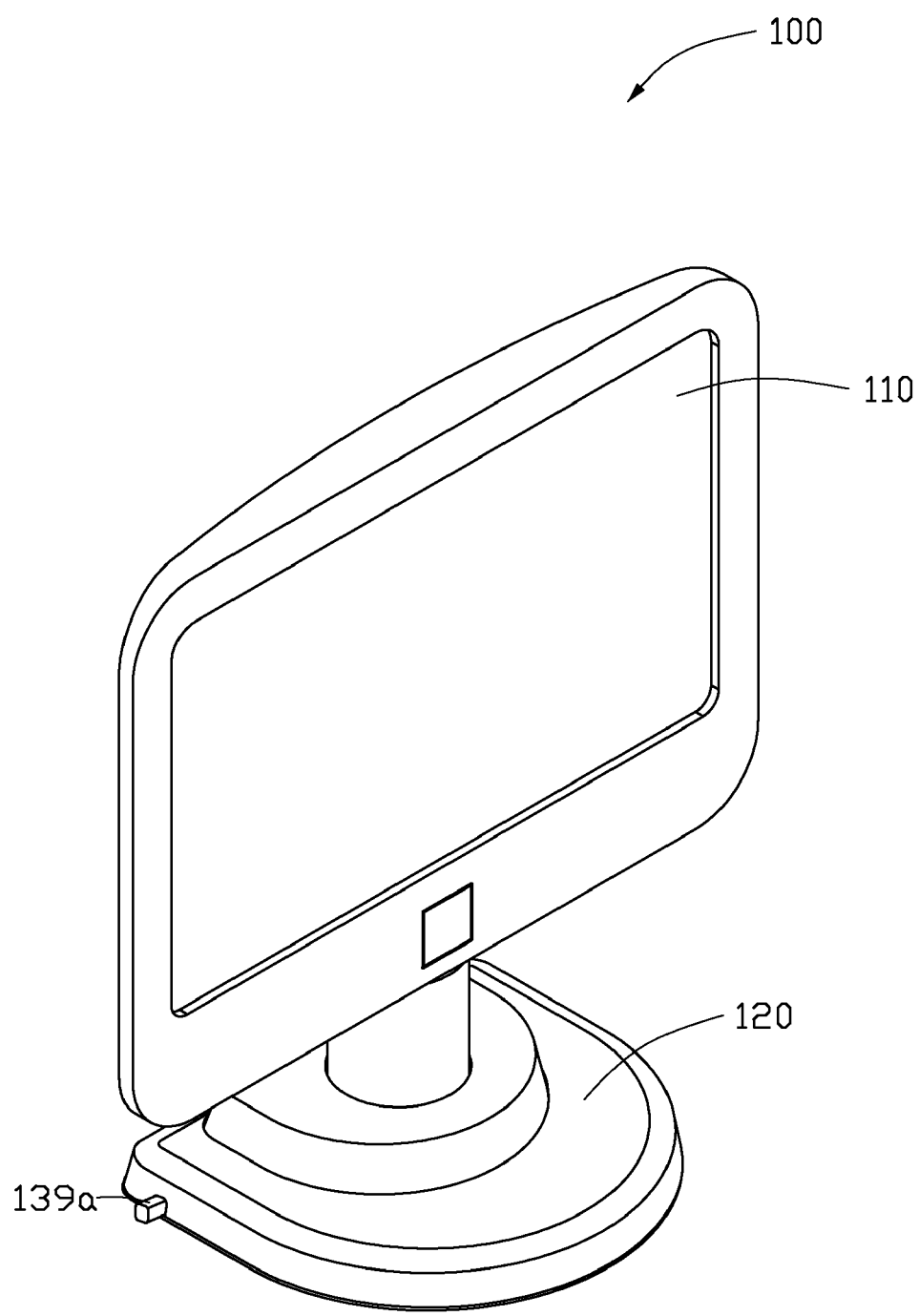
FIG. 1 is an isometric view of a display according to an exemplary embodiment.
Figure 2:
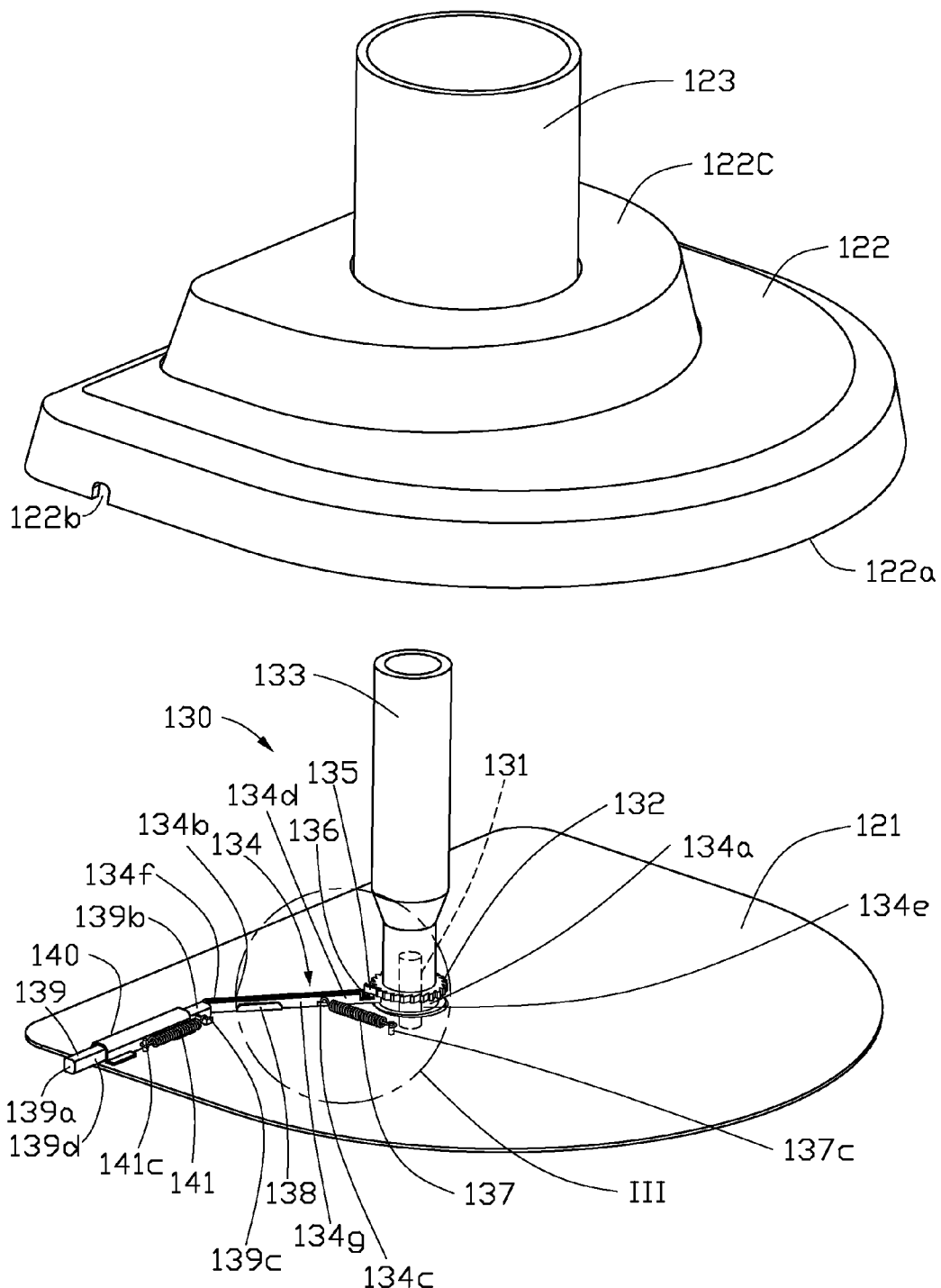
FIG. 2 is an isometric view of a rotation device of the display of FIG. 1.

Referring to FIGS. 1 and 2, a display 100, in accordance with an exemplary embodiment, includes a display panel 110, a base 120 and a rotation device 130.

The base 120 includes a bottom plate 121, a cover 122, and a support member 123. The bottom plate 121 is connected to a bottom portion 122a of the cover 122. A recess 122b is defined in the bottom portion 122a. The support member 123 is connected to a top portion 122c of the cover 122. The support member 123 is a hollow cylindrical tube communicating with the cover 122. The support member 123 is configured for supporting the display panel 110.

The rotation device 130 includes a fixed shaft 131, a ratchet wheel 132, a rotation shaft 133, a pendulum rod 134, a pawl 135, a first elastic member 136, a second elastic member 137, a limitation member 138, a slide member 139, a guide bush 140, and a third elastic member 141.

The fixed shaft 131 is fixed to the bottom plate 121. The ratchet wheel 132 is substantially a gear wheel and defines a plurality of recesses 132a in the circumference thereof. The ratchet wheel 132 is rotationally connected to the bottom plate 121. In the present embodiment, the ratchet wheel 311 is placed over the fixed shaft 131 (i.e. the ratchet wheel 131 is rotatable around the fixed shaft 131).

The rotation shaft 133 is fixedly connected between the ratchet wheel 132 and the display panel 110, and can rotate with the ratchet wheel 132. In detail, one end of the rotation shaft 133 is fixed to the ratchet wheel 132, and the other end of the rotation axis 133 passes through the support member 123 and is fixed to the display panel 110.

Figure 3:
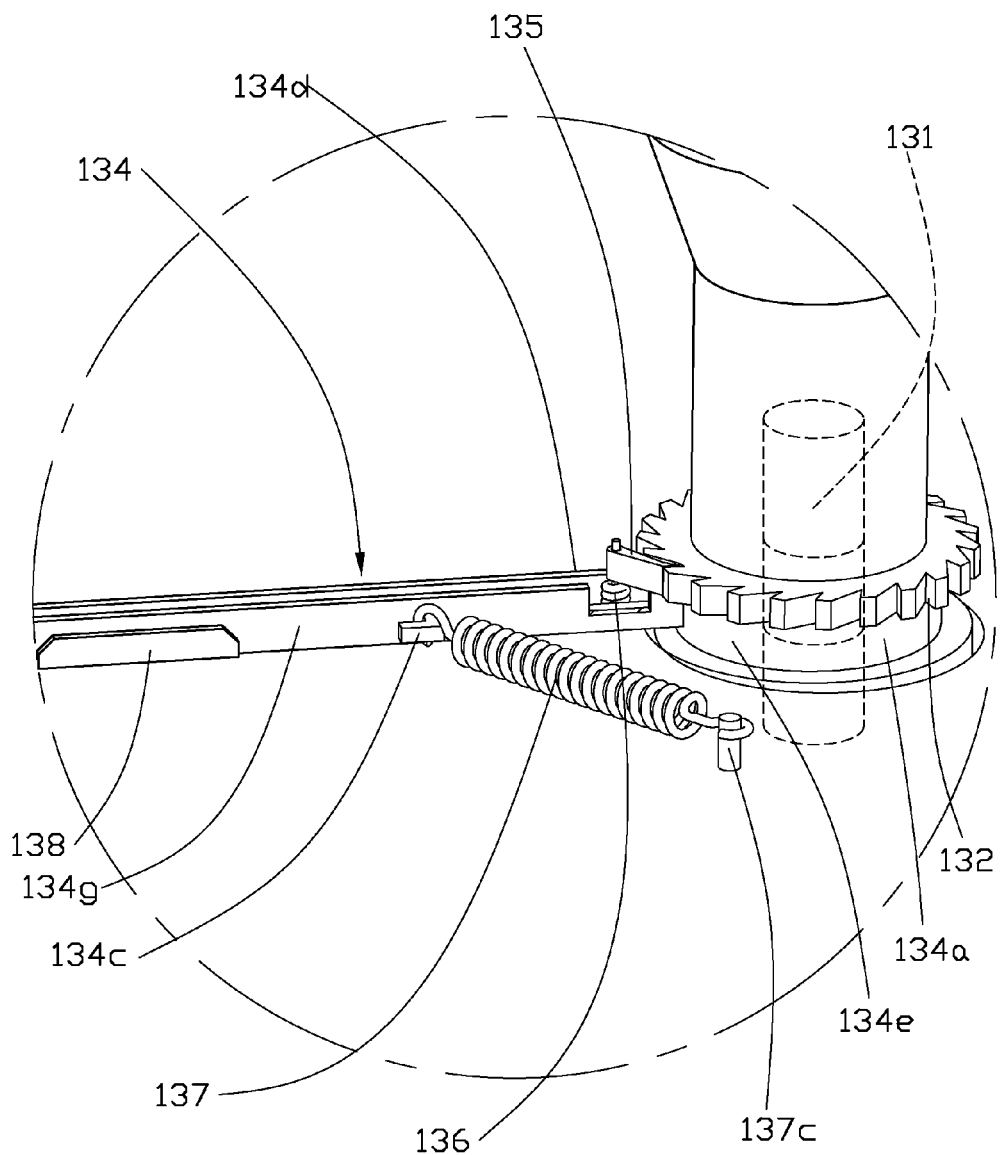
FIG. 3 is an enlarged view of a circled portion III of FIG. 2.

Referring also to FIGS. 2 and 3, the pendulum rod 134 includes a rotation portion 134a, a slide portion 134b, and a first hook 134c. The rotation portion 134a and the slide portion 134b are positioned at opposite ends of the pendulum rod 134.

The rotation portion 134a is a hollow cylindrical structure, and is rotationally connected to the bottom plate 121. In the present embodiment, the rotation portion 134a is placed over the fixed shaft 131 (i.e. the rotation portion 134a is rotatable around the fixed shaft 131).

The slide portion 134b is a connecting rod. An end 134d of the slide portion 134b is fixedly connected to an outer circumference 134e of the rotation portion 134a, and the other end 134f of the slide portion 134b is slidably connected to the slide member 139. The first hook 134c is fixed on a lateral surface 134g of the slide portion 134b.

The pawl 135 is rotationally connected to the end 134d, and engages with the ratchet wheel 132. The first elastic member 136 connects the pawl 135 and the slide portion 134b, for supplying a restoring force to the pawl 135, such that the pawl 135 can return to its original position with the help of this restoring force. In the present embodiment, the first elastic member 136 is a torsion spring.

The second elastic member 137 is connected between the pendulum rod 134 and the bottom plate 121. In the present embodiment, the second elastic member 137 is a coil spring. A first locating post 137c is fixed on the bottom plate 121. One end of the second elastic member 137 is fixed to the first hook 134c, and the other end of the second elastic member 137 is fixed on the first locating post 137c.

The limitation member 138 is fixed on the bottom plate 121 as a barrier to limit the position of the pendulum rod 134 when the pendulum rod 134 returns to its original position. In the present embodiment, the limitation member 138 is an L-shaped stop plate.

The guide bush 140 is fixed on the bottom plate 121. The slide member 139 is a guide rod. The slide member 139 passes through the guide bush 140 (i.e. the slide member 139 is received in the guide bush 140), and can slide relative to the guide bush 140.

The slide member 139 includes a pressing portion 139a, an abutting portion 139b, and a second hook 139c. The pressing portion 139a and the abutting portion 139b are located at the two opposite ends of the slide member 139, and protrude out of the two opposite ends of the guide bush 140, respectively.

The pressing portion 139a protrudes out of the recess 122b. The abutting portion 139b butts against the slide portion 134b of the pendulum rod 134, and the abutting portion 139b can slide along the lateral surface 134g of the slide portion 134b. The second hook 139c is fixed on a lateral surface 139d of the abutting portion 139b.

The third elastic member 141 is connected between the slide member 139 and the bottom plate 121. In the present embodiment, the third elastic member 141 is a coil spring. A second locating post 141c is fixed on the bottom plate 121 adjacent to the guide bush 140. One end of the third elastic member 141 is fixed to the second hook 139c, and the other end of the third elastic member 141 is fixed on the second locating post 141c.

Figure 4:
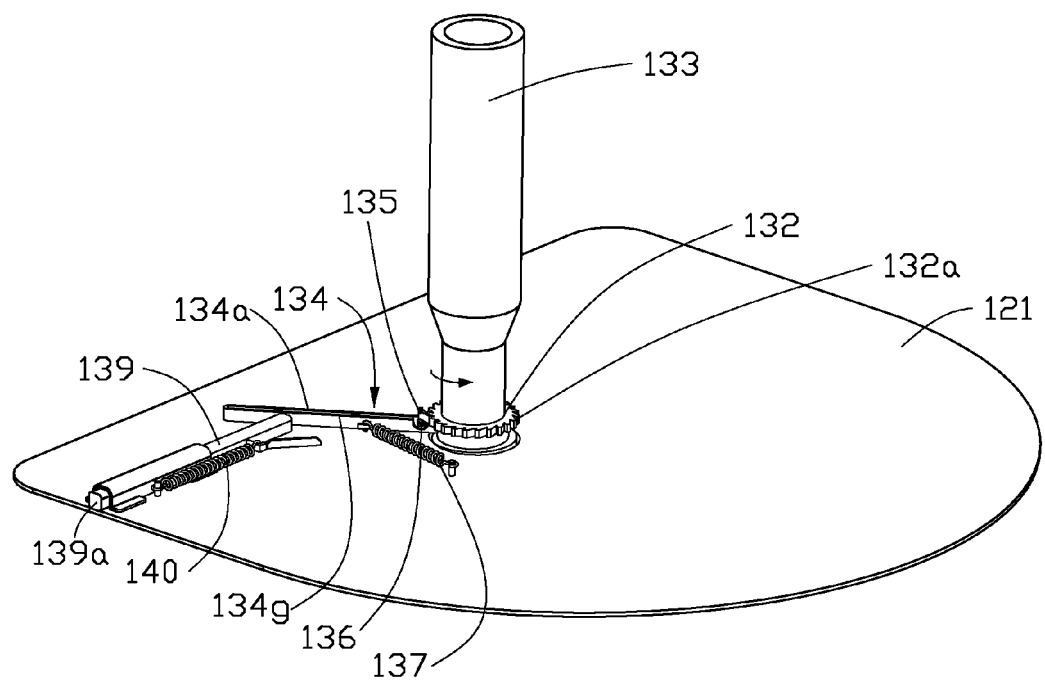
FIG. 4 is a view of the rotation device of FIG. 2 revealed in operation.

Referring also to FIG. 4, when the display panel 110 needs to be rotated, the pressing portion 139a is firstly pushed towards the cover 122, such that the slide member 139 slides on the lateral surface 134g of the slide portion 134b, the pendulum rod 134 is rotated, and the rotation portion 134a is rotated around the fixed shaft 131. Accordingly, the pawl 135 slides out of a recess 132a of the ratchet wheel 132, and is then forced into another adjacent recess 132a of the ratchet wheel 132 with the help of the torsion force of the first elastic member 136.

When the pressing portion 139a is released, the slide member 139 returns to its original position with the help of the third elastic member 141, and the pendulum rod 134 returns to its original position with the help of the second elastic member 137. Accordingly, the pawl 135 may push the ratchet wheel 132 with the rotation shaft 133 to rotate around the fixed shaft 131 in the process of the pendulum rod 134 returning to its original position, such that the display panel 110 connected to the rotation shaft 133 can with ease be horizontally rotated by the ratchet wheel 132.

The display panel 110 can be horizontally rotated by pushing the pressing portion 139a, and accordingly the amount of effort required to horizontally rotate the display 100 by hand is much reduced.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A display comprising:
   a base comprising a bottom plate;
   a display panel;
   a rotation device for making the display panel horizontally rotate relative to the base, the rotation device comprising:
      a ratchet wheel movably connected to the bottom plate, the display panel being fixed on the ratchet wheel through a rotation shaft and capable of rotating with the ratchet wheel;
      a pendulum rod rotationally connected to the ratchet wheel;
      a pawl rotationally connected to the pendulum rod, and engaging with the ratchet wheel;
      a first elastic member being connected between the pendulum rod and the pawl for supplying a restoring force to the pawl;
      a second elastic member being connected between the bottom plate and the pendulum rod for supplying a restoring force to the pendulum rod;
      a slide member slidably connected to the pendulum rod; and
      a third elastic member connected between the slide member and the bottom plate for supplying a restoring force to the slide member.

2. The display of claim 1, further comprising a limitation member, the limitation member being fixed on the bottom plate for limiting the position of the pendulum rod when the pendulum rod returns to its original position.

3. The display of claim 2, wherein the limitation member is an L-shaped plate.

4. The display of claim 1, wherein the rotation shaft fixed on the bottom plate, the ratchet wheel is movably connected to the rotation shaft, and the pendulum rod is rotationally connected to the rotation shaft.

5. The display of claim 1, wherein the rotation device comprises a guide bush fixed on the bottom plate, the slide member is a guide rod received in the guide bush.

6. The display of claim 5, wherein the pendulum rod comprises a rotation portion, a slide portion, and a first hook, the rotation portion and the slide portion are positioned at two opposite ends of the pendulum rod, the rotation portion is rotationally connected to the bottom plate, the slide portion is a connecting rod, an end of the slide portion is fixedly connected to an outer circumference of the rotation portion, and the other end of the slide portion is slidably connected to the slide member, the first hook is fixed on a lateral surface of the slide portion, and the second elastic member is connected between the first hook and the bottom plate.

7. The display of claim 6, wherein the slide member comprises a pressing portion, an abutting portion, and a second hook, the pressing portion and the abutting portion are located at two opposite ends of the slide member, the abutting portion abuts against the slide portion of the pendulum rod, the second hook is fixed on the abutting portion, the third elastic member is connected between the bottom plate and the second hook.

8. The display of claim 7, wherein the base comprises a cover and a support member, the bottom plate is connected to a bottom portion of the cover, the bottom portion of the cover defines a recess, the pressing portion protrudes out of the recess, the support member is connected to a top portion of the cover, the support member is configured for supporting the display panel.

9. The display of claim 1, wherein the first elastic member, the second elastic member, and the third elastic member are springs.

10. The display of claim 1, wherein the ratchet wheel is substantially a gear wheel and defines a plurality of recesses in the circumference thereof, and the pawl is partially received in one of the recesses.

* * * * *